United States Patent Office 3,482,887
Patented Dec. 9, 1969

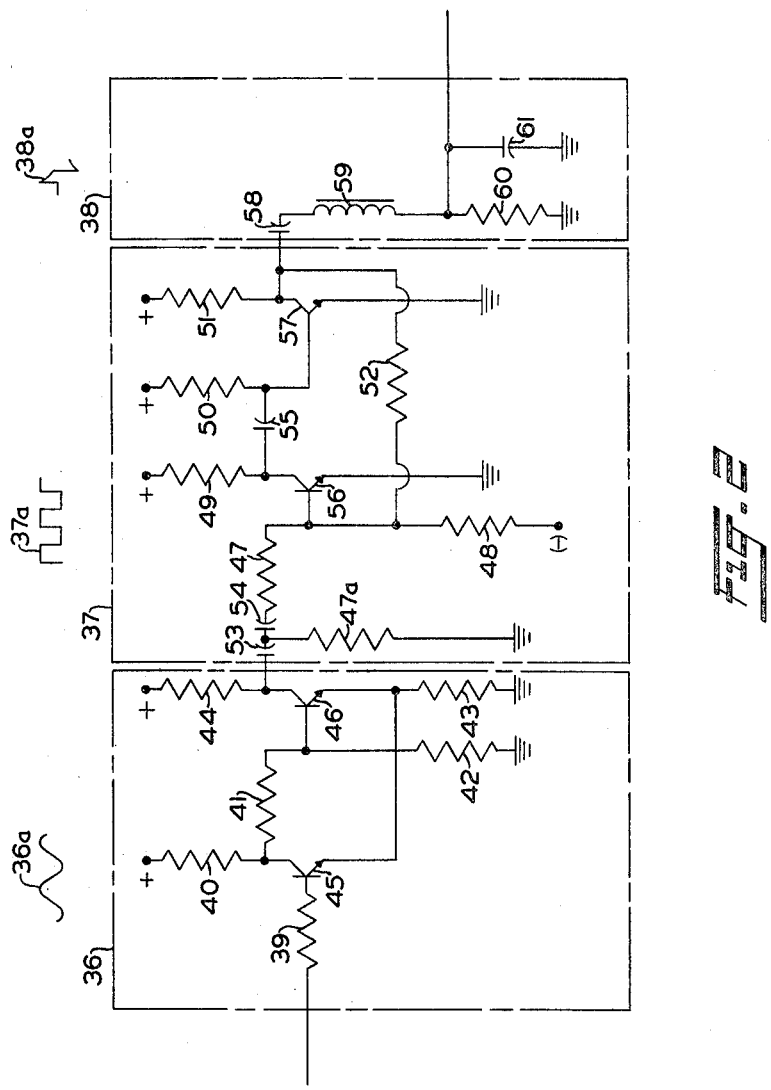

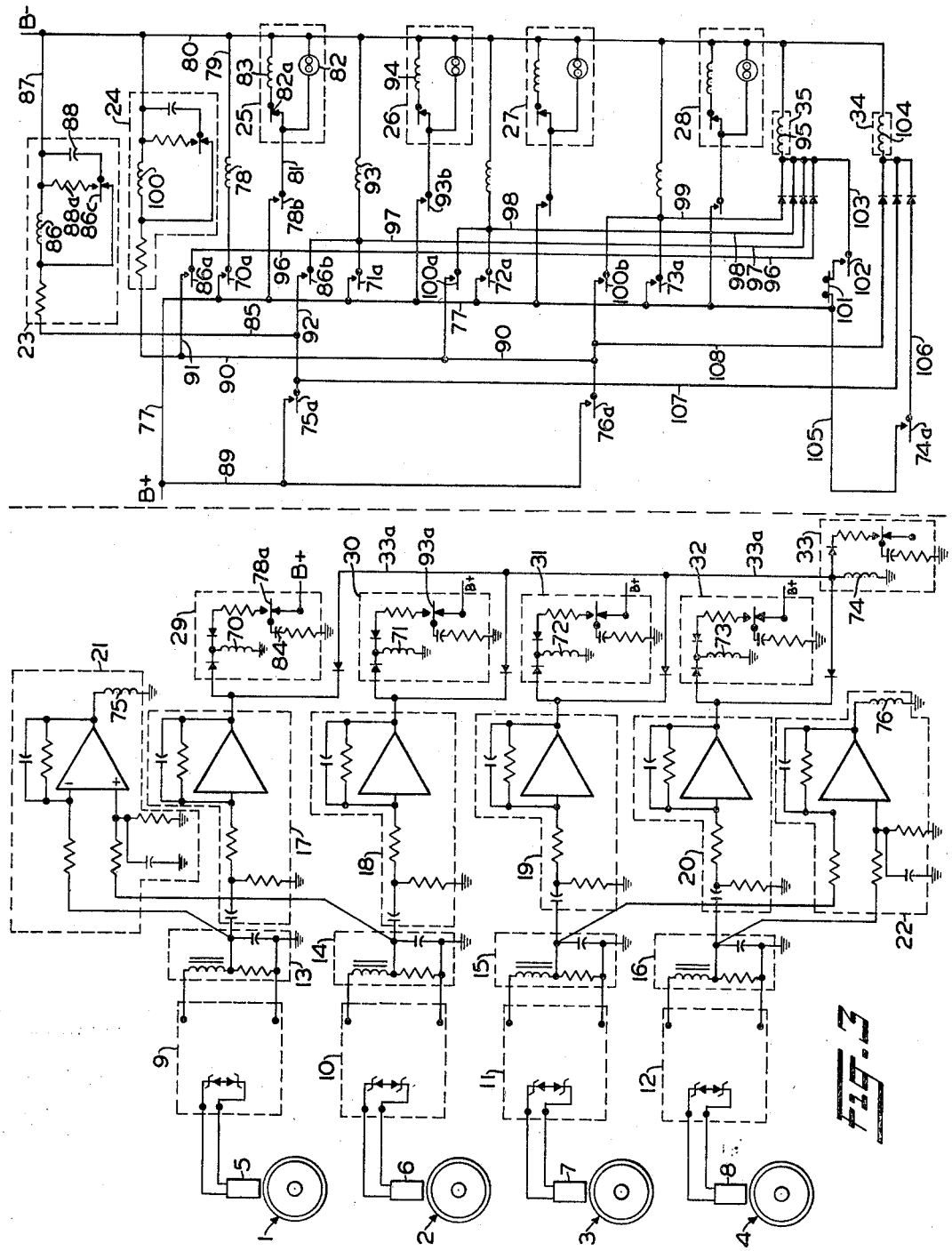

3,482,887
COMBINED ANTI-SLIP AND ANTI-SPIN CONTROL FOR VEHICLE WHEELS
Charles W. Sheppard, Trafford, Pa., assignor to Westinghouse Air Brake Company, Wilmerding, Pa., a corporation of Pennnsylvania
Filed Jan. 26, 1968, Ser. No. 700,830
Int. Cl. B60t 8/06
U.S. Cl. 303—21                                    14 Claims

ABSTRACT OF THE DISCLOSURE

Apparatus for controlling the degree of braking in a braking mode and propulsion power in a propulsion mode to correct slip, slide or spin of the vehicle wheels, comprising primary sensor means responsive to individual vehicle wheel rate of change of speed, and a secondary sensor means constituting a comparator of speeds of two different wheels, effective if the primary sensor means fails to effect appropriate control within a certain interval of time after the initial occurrence of wheel slip or wheel spin.

BACKGROUND OF THE INVENTION

The terms "slip," "spin" and "slide" as employed herein refer to different rotation conditions of a wheel and may be differentiated as follows.

"Slip" or its variants refers to deceleration of a vehicle wheel at a rate exceeding that corresponding to the rate of retardation of the vehicle occasioned by excessive braking force or loss of wheel-to-rail adhesion with normal braking forces.

"Spin" or its variants refers to acceleration of a vehicle wheel at a rate exceeding that corresponding to the rate of acceleration of the vehicle occasioned by application of excessive propulsion power to the wheel or loss of wheel-to-rail adhesion during application of normal propulsion power.

"Slide" or its variants refers to complete cessation of rotation or locking of a vehicle wheel while the vehicle continues to travel.

Various mechanical or electrical types of apparatus have been previously known and employed to sense an undesired rate of change of rotational speed on an individual wheel and axle unit, such as occurs incident to a slipping or spinning condition thereof, and effect operation of appropriate controls to correct the slip or spin and effect return of the wheel and axle unit to the desired vehicle speed.

Various mechanical and electrical means have been provided to sense a predetermined difference in speed of two separate wheels to recognize a slip or spin condition and operate to cause appropriate individual controls to correct the faulty condition and effect return of the slipping or spinning wheel or wheel and axle unit to vehicle speed.

It is the object of the present invention to utilize both types of wheel slip or wheel spin sensing devices in a single control apparatus in a manner that one device serves to back-up the other, and thus insure appropriate control of braking or propulsion so as to prevent wheel sliding or spinning.

SUMMARY OF THE INVENTION

According to the present invention, there is provided a wheel change of speed detection apparatus comprising new and novel circuit means including both a primary sensor means consisting of differentiator circuitry or monostable multivibrator means to sense an undesired rate of change of rotational speed of an individual wheel and axle unit and a secondary sensor means consisting of comparator circuitry or summation amplifier means to sense a predetermined difference in speed of two separate wheels, to cooperatively operate to alter the braking or acceleration operation through the use of said primary sensor means and after a time interval, through the use of said secondary sensor means to insure prevention of wheel slide or spin.

In the accompanying drawing, FIG. 1 is a block diagram of a four-axle railway vehicle utilizing the novel circuitry described herein.

FIG. 2 is a combined block diagram and circuit diagram of the velocity sensing apparatus shown in the over-all block diagram of FIG. 1.

FIG. 3 is a schematic diagram of the over-all electronic wheel slip apparatus.

DESCRIPTION

Figure 1:
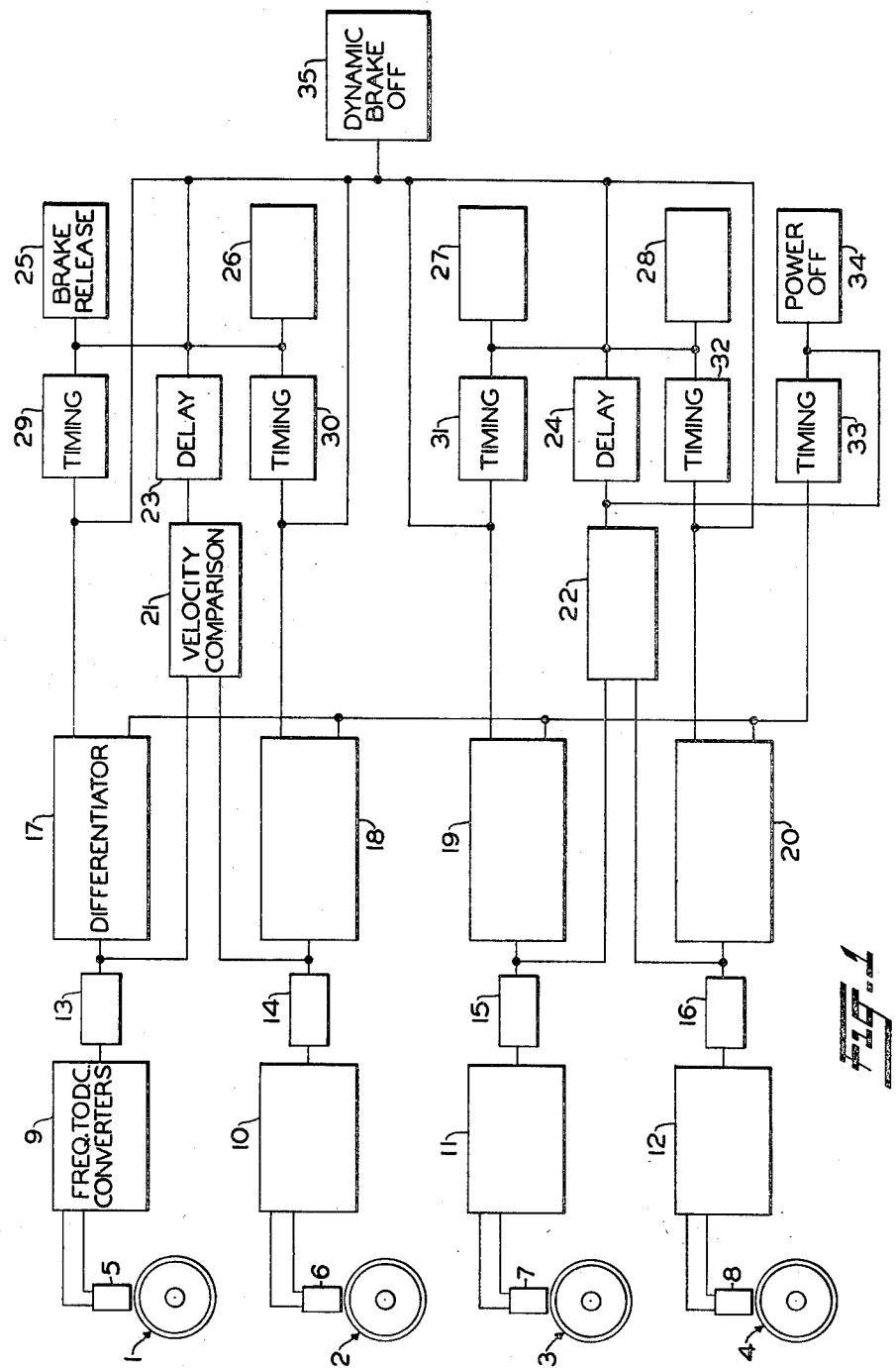

Referring to FIG. 1 of the drawings, there is shown a plurality of vehicle wheel and axle units 1, 2, 3 and 4, each unit consisting of two wheels (only one of which is shown) secured to opposite ends of an axle. Associated with each axle unit is a tach-generator 5, 6, 7 and 8, respectively, each comprising a well-known magnetic proximity pickup which monitors actual speed by use of an axle driven gear-tooth passing through a magnetic field to cause generation of an AC voltage, the frequency of which is proportional to rotational speed of the gear which in turn is proportional to the speed of the train. Their signal outputs are variable amplitude, variable frequency AC voltages. The frequency is dependent on the number of gear teeth (a constant) and actual speed of rotation of the axle. The output of the tach-generators is fed to frequency to DC converters 9, 10, 11 and 12 respectively, one of which is shown in greater detail in FIG. 2 explained hereinafter. The output of these converters is ripple-free DC voltages, the magnitudes of which are proportional to the frequency of the input signals from the tach-generator. The converters are not influenced by the voltage magnitude of the input signal above a low threshold value. It is thus insensitive to variances caused by pickup air gap lengths and other ripple influencing factors such as out-of-round gears and shaft run-out. The pulsed output of the converters is filtered via filters 13, 14, 15 and 16 respectively such that the output thereof is a pure DC voltage indicative of axle velocity. This DC voltage output from the filters is fed into differentiators 17, 18, 19 and 20 respectively for each axle; and simultaneously, the voltage outputs from the filters 13 and 14 are fed into a voltage comparison device 21, while the voltage outputs of filters 15 and 16 are fed into a voltage comparison device 22. The velocity comparison devices compare speeds of two axles of a truck such that the output of the comparators will be zero if the two axles are at the same instantaneous velocity with no slipping action occurring.

The output of the velocity comparison devices 21 and 22 is supplied via delay circuitry indicated herein as blocks 23 and 24, to control the brake release circuitry represented by block diagrams 25, 26, 27 and 28 further explained hereinafter. The output of the differentiators 17, 18, 19 and 20 is supplied via timing circuitry represented by blocks 29, 30 31 and 32, to control the aforementioned brake release circuitry represented by blocks 25, 26, 27 and 28. During braking operative conditions or so-called braking mode, the output of the differentiators is positive with respect to ground, and during acceleration operative conditions or so-called acceleration mode, it is negative. The magnitude of this voltage is determined by the rate of change of velocity and is preadjusted such that it is sufficient to effect pickup of coils associated with the differentiator circuitry only during wheel slip as explained hereinafter. During propulsion mode, the output of the differentiators also controls via a separate timing circuitry represented by block 33 a power-off circuitry represented by block 34. During a braking mode, the output of the differentiators also controls a dynamic brake-off circuitry represented by block 35, the operation all of which is explained hereinafter.

Referring to FIG. 2, the frequency to DC converters comprise three separately described circuits represented in FIG. 2 within blocks 36, 37 and 38, explained hereinafter. The block 36 represents a so-called Schmitt trigger device wherein the frequency from the axle-speed-sensing tach-generator, represented herein in the shape of a sine wave at 36a, is converted to a square wave DC output represented at 37a. The Schmitt trigger device turns on at its upper trip point on each cycle of the AC input from the tach-generator, thereby producing a square wave output of the same frequency as the input sine wave. An understanding of the operation of the Schmitt trigger is not necessary to an understanding of this invention and furthermore is well-known such that circuitry need only be shown herein within block 36 comprising a plurality of resistors 39, 40, 41, 42, 43 and 44 and transistors 45 and 46 interconnected in a well-known manner.

The output of the Schmitt trigger device 36 being a square wave output represented by 37a is fed to a pulse shaper device consisting of circuitry within block 37 which operates in a usual well-known manner to take the leading edge of the square wave from the output of the Schmitt trigger device and shape it into a spike output as shown at 38a. The understanding of the operation of the pulse shaper device or so-called RC differentiator is not necessary to an understanding of the invention and furthermore is well-known and thus needs only be represented herein within block 37 by a plurality of resistors 47, 47a, 48, 49, 50, 51 and 52 with condensers 53, 54 and 55 interconnected with two transistors 56 and 57 in a well-known manner.

The spike shaped output of the pulse shaping device 37 is utilized to trigger a monostable or so-called "one-shot" multivibrator device consisting of circuitry within block 38 comprising a condenser 58, a coil 59, a resistor 60 and condenser 61 interconnected in a well-known manner to provide an output of constant amplitude and constant frequency with the frequency being proportional to the input frequency at 36a.

Referring to FIG. 3, there is a more detailed view of the system shown in FIG. 1. FIG. 3 is a schematic view of apparatus showing elements of the circuitry of each of the different components of FIG. 1. In that most of the components of this new and novel circuit arrangement forming the system are well-known, a detailed description of each component is not provided herein but is explained where necessary hereinafter with the accompanying description of operation of the system.

OPERATION

In operation with the vehicle moving and a brake application initiated by use of a well-known application and release valve in conjunction with a control valve (not shown), the axle velocity as determined by the tach-generators will be decreasing at a predetermined rate, resulting in a predetermined output of positive voltage with respect to ground from the differentiators 17, 18, 19 and 20. As long as no wheel slipping occurs, this positive voltage from the differentiators is of a magnitude insufficient to effect pickup of the pickup coils 70, 71, 72 and 73 included in the respective timing circuitry 29, 30, 31 and 32 for the respective differentiators 17, 18, 19 and 20.

With no slipping occurring, the output of the voltage comparison devices 21 and 22 will be zero since all axle velocities are the same. With zero output from the voltage comparison devices 21 and 22, the pickup coils 75 and 76 included in the respective circuitry of said devices, will be de-energized.

In the event of a wheel slip and the accompanying undesired increased deceleration, as for example on wheel unit 1, the differentiator circuitry 17 thereof will be responsive to the resultant increased rate of deceleration of the wheel, to effect an increased positive voltage on the pickup coil 70 to thereby cause energization of said coil to a magnitude sufficient to effect pickup of a contact member 70a thereof. Pickup of contact member 70a completes circuitry from the positive side of a suitable source of DC supply indicated herein merely as "B+," via wire 77, closed contact member 70a to a pickup coil 78, and wires 79 and 80 to the ground or negative side of said source of DC supply indicated herein as "B—." Energization of the pickup coil 78 causes the contact member 78a of the timing circuitry 29 to move to its upper closed position, and also causes closure of contact member 78b leading to the brake release circuitry 25 for wheel unit 1. With closure of contact member 78b the brake release circuitry is energized via wire 81, normally closed contact 82a of a parallel connected thermal fail-safe relay 82, pickup coil 83 of a dump valve (not shown) for effecting a brake release, and wire 80 to the ground "B—." Energization of the coil 83 causes a dump valve (not shown) to release the brakes on wheel unit 1 to effect stopping of the wheel slip and restoration of the wheel unit back to vehicle speed. Energization of the thermal fail-safe relay 82 in parallel with coil 83 is a safety precaution to energize said relay for a predetermined length of time at which a normal over-heating will effect opening of the contact member 82a to prevent energization of the coil 83 and thereby limit the duration of the brake release so effected by energization of said coil 83. Closure of contact member 78a in its upper closed position starts a timing procedure by utilizing the discharge time of a condenser circuit including condenser 84, which is normally charged from an external source shown as "B+" via contact member 78a in its lower closed position. The condenser 84 will now discharge through the pick-up coil 70 for a predetermined period of time sufficient to maintain the coil energized and contact member 70a thereof picked up long enough to insure sufficient reduction in the fluid pressure in the brake cylinder to correct the occurring wheel slip as described, and then effect drop-out of the contact member 70a of coil 70 to cause restoration of braking to the wheel unit 1.

The differentiator circuitry 17 and the velocity comparison circuitry 21 are both energized simultaneously upon occurrence of the described wheel slip; however, a delaying circuitry 23 explained hereinafter renders the comparison circuitry 21 ineffective for a predetermined period of time so as to become a so-called "back-up" circuitry for the differentiator circuitry hereinafter explained. The occurrence of a wheel slide or slip as previously explained causes a supply of DC voltage to the differentiator circuitry 17 or 18 depending on which axle unit 1 or 2 that the wheel slide or slip occurs. Simultaneously, the comparison of wheel velocity between the wheel units 1 and 2 during said wheel slip, as determined by the comparison circuitry 21, causes a DC voltage to be established across the coil 75 thereof. The voltage to the differentiator circuitry, if of sufficient degree, is effective to cause a brake release via the dump valves as previously described. However, if this voltage is of insufficient degree to effect pick-up of either coil 70 or 71, after a time delay described hereinafter, the energization of coil 75 in the comparison circuitry 21 becomes effective to cause a brake release in the following manner.

Energization of the pick-up coil 75 effects closure of the contact member 75a which completes a circuit from the DC supply "B+" via said contact member 75a and wire 85 to a pick-up coil 86 in the delay circuitry 23 and thence by way of wire 87 to the negative side of DC supply at "B—."

A condenser 88 in parallel with the pick-up coil 86 must be charged before the coil 86 is sufficiently energized to effect pick-up of the contact members thereof, thereby providing the aforementioned time delay for said coil. With pick-up coil 86 energized after the time delay, the contact members 86a, 86b and 86c are closed. Closing contact member 86a completes circuitry from the DC supply at "B+" to the pick-up coil 78 via wire 89, closed contact member 75a, wire 90, wire 91, closed contact 86a, coil 78 and wire 80 to "B—" to cause closure of contact member 78b to effect energization of the coil 83 of a dump valve (not shown) and effect a brake release on wheel unit 1. Closing contact member 86b completes circuitry from "B+" via wire 89, closed contact member 75a, wire 92, closed contact member 86b, pick-up coil 93 and wire 80 to "B—" to cause closure of contact members 93a in the timing circuitry 30 and 93b adjacent the release circuitry 26 to effect energization of a pick-up coil 94 in the brake release circuitry 26 to effect operation of a dump valve (not shown) to release the brake on wheel unit 2 in a manner similar to that described in connection with wheel unit 1. Closing of contact member 86c in its upper position permits the discharge of the condenser 88 through a resistor 88a thereby conditioning it for subsequent recharging operation upon receipt of a voltage signal from the comparison device 21 as previously described. Upon equalization of the velocity of the wheel units 1 and 2 as will be effected by the aforedescribed brake release thereon, the voltage signal to the comparative circuitry 21 will be reduced to zero and cause de-energization of coils 75, 86, 78, 83, 93 and 94, which in turn will terminate the brake release condition effected thereby.

The just described opeartion of a wheel slip on axle 1 being corrected by the use of the differentiator circuitry 17 or comparator circuitry 21 is identical to operation of the remaining shown sensing and correcting circuitry when wheel slip occurs on another axle as follows:

(a) Wheel slip on wheel unit 1 is sensed by the output of converter 9 and corrected by the combined circuitry including differentiator circuitry 17 in conjunction with timing circuitry 29 and brake release circuitry 25, backed-up by the comparator circuitry 21, in conjunction with the delay circuitry 23 and both brake release circuitry 25 and 26.

(b) Wheel slip on wheel unit 2 is sensed by the output of converter 10 and corrected by the combined circuitry including differentiator circuitry 18 in conjunction with timing circuitry 30 and brake release circuitry 26, backed-up by the comparator circuitry 21 in conjunction with the delay circuitry 23 and both brake release circuitry 25 and 26.

(c) Wheel slip on wheel unit 3 is sensed by the output of converter 11 and corrected by the combined circuitry including differentiator circuitry 19 in conjunction with timing circuitry 31 and brake release circuitry 27, backed-up by the comparator circuitry 22 in conjunction with the delay circuitry 24 and both brake release circuitry 27 and 28.

(d) Wheel slip on wheel unit 4 is sensed by the output of converter 12 and corrected by the combined circuitry including differentiator circuitry 20 in conjunction with timing circuitry 32 and brake release circuitry 28, backed-up by the comparator circuitry 22 in conjunction with the delay circuitry 24 and both release circuitry 27 and 28.

It can thus be seen that during a braking situation there are provided two separate wheel slip sensing circuitries with one circuitry being conditioned by time delay circuitry for "backing up" the other circuitry. The velocity rate sensing circuitry utilizing the deceleration rate as a means for effecting operation of the differentiator circuitry described herein is given operational precedence over the wheel speed comparison circuitry utilizing the comparator circuitry for the reason that the velocity rate sensing circuitry is effective to control release of the braking forces on an individual axle where as the comparator circuitry is effective to control release of the braking forces on both axles of a truck in that there is no means provided in the comparator circuitry for determining which axle is slipping, and single wheel unit control is effected more easily. If only the differentiator circuit were utilized, the input voltage trigger level thereto would have to be set low by pre-selection of the values of the elements thereof, to respond to slip occurring at low rates and possibly result in an undesired oscillating braking action from repeated releases and reapplication.

The use of both differentiator circuitry and comparator circuitry permits the input voltage trigger level of the differentiator circuitry to be set at a relatively high rate before energization thereof effects the operation thereof as previously explained, thereby enabling a possible self-correcting action of slip causing means before the operation of the circuit could effect the described brake release. While the input voltage is at said high rate, the comparator circuitry would become effective at lower input levels after a mentioned predetermined time interval to "back-up" the differentiator circuitry unless the slide causing means is self-correcting prior to termination of said time interval.

It should be noted that upon detection of a wheel slip by either the differentiator circuitry or the comparator circuitry, a coil 95 in the dynamic brake-off circuitry 35 is energized responsive to operational energization of the selected one of the differentiator circuitry 17, 18, 19 or 20 by way of the "B+" source, wire 77 and respectively selected circuitry including: contact member 70a and wire 96; or contact member 71a and wire 97; or contact member 72a and wire 98; or contact member 73a and wire 99; and by way of the selective comparator circuitry 21 and 22 by way of the "B+" source, wire 89, contact member 75a, wires 90 and 91, contact member 86a and wire 96; or contact member 75a, wire 92, contact member 86b and wire 97; or "B+" source, wire 89, contact member 76a, wire 90, contact member 100a of coil 100 and wire 98, or contact member 76a, contact member 100b and wire 99, such that coil 95 is energized responsive to detection of wheel slip by any one of the differentiator circuitry means or comparator circuitry means. Energization of coil 95 effects establishment of a plurality of dynamic braking control circuits by means not shown to nullify any dynamic braking action in effect and also establishes a self-holding circuit by way of wire 77, reset which 101, the now picked-up contact member 102 of coil 95 and wire 103 to maintain the dynamic brake-off circuitry 35 effectively energized until the reset switch 101 (normally biased to a closed position) is manually opened after a wheel slip condition has been corrected to thereby render any further dynamic braking mode effective.

In a propulsion or motoring mode, should a wheel spin occur at a substantial rate, the rate sensing of any of the differentiator circuitries will effect energization and pick-up of a coil 74 by way of wire 33a connected to all the differentiator circuitries, to effect closure of contact member 74a to in turn effect energization of a coil 104 of the power-off circuitry 34 by way of "B+" source, wire 77, wire 105 closed contact member 74a, and wire 106. Energization of the power-off circuity 34 effects shut off of propulsion means by controls not shown which in turn effects correction of the wheel spin condition. Should the wheel spin condition be a low rate insufficient to effect detection by the differentiator circuitry and continue for a time delay sufficient to effect operational energization of the comparator circuitry 21 or 22, the power-off circuitry 34 is operatively energized respectively by way of the "B+" source, wire 89, contact member 75a and wire 107, or wire 89, contact member 76a and wire 108. It can thus be seen that in a wheel spin condition during a propulsion mode, the power-off circuitry is operatively effective to cause a cessation of propulsion motors to effect a correction of the wheel spin.

In summation it can be seen that wheel slip or slide in a braking mode or spin in a propulsion mode is corrected by the differentiator circuitry, backed-up by the comparator circuitry to effect a brake release and/or a propulsion motor shut-off as is necessary to correct the undesired wheel condition.

Having now described the invention, what I claim as new and desire to secure by Letters Patent, is:

1. Velocity control apparatus for a railway vehicle, comprising, in combination:
    (a) primary means for sensing acceleration and deceleration of a vehicle wheel at a rate characteristic of wheel spin and wheel slip, respectively,
    (b) secondary means for sensing a differential in the speed of two separate wheels on two separate axles during braking and during propulsion of the vehicle characteristic respectively of a wheel slipping and spinning condition of either of two wheels,
    (c) brake control means,
    (d) propulsion control means,
    (e) means subject to control of said primary means and said secondary means for effecting operation of said brake control means during a braking mode to correct a slipping condition so as to prevent wheel slide and also subject to control of said primary means for effecting operation of said propulsion control means during a propulsion mode to prevent a wheel spinning condition, and
    (f) timing means for causing said secondary means to become effective to cause operation of said brake control means or said propulsion control means a certain interval of time after a wheel slip or wheel spin condition occurs without full corrective control action by the said primary means.

2. Velocity control apparatus for a railway vehicle, as claimed in claim 1, wherein said primary means comprises acceleration and deceleration sensing circuitry means, including:
    (a) speed responsive tachometer generator means providing a voltage, the frequency of which is proportional to the actual speed of a vehicle wheel,
    (b) converter means operative responsive to supply of said voltage from said tachometer generator means to supply a control voltage corresponding in degree to vehicle wheel speed, and
    (c) differentiator means for sensing a rate of change of said control voltage exceeding a certain degree.

3. Velocity control apparatus for a railway vehicle, as claimed in claim 1, wherein said secondary means comprises a wheel speed comparision circuitry means, including:
    (a) speed responsive tachometer generator means for each of a plurality of vehicle wheels providing a voltage, the frequency of which is proportional to the actual speed of the corresponding vehicle wheel,
    (b) converter means for each of said generator means operative responsive to supply of said voltage from said tachometer generator means to supply a control voltage, and
    (c) velocity comparison circuitry means for comparing the output control voltages from two of said converter means and providing a control signal upon the occurrence of a predetermined difference in the output control voltages therefrom.

4. Velocity control apparatus for a railway vehicle, as claimed in claim 1, wherein:
    (a) said primary means comprises acceleration and deceleration sensing circuitry means, including:
        (i) speed responsive tachometer generator means providing a voltage, the frequency of which is proportional to the actual speed of a vehicle wheel,
        (ii) converter means operative responsive to supply of said voltage from said tachometer generator means to supply a control voltage,
        (iii) differentiator means for sensing a rate of change of said control voltage exceeding a certain degree, and
    (b) said secondary means comprising a wheel speed comparision circuitry means, including:
        (i) speed responsive tachometer generator means for each of a plurality of vehicle wheels providing a voltage, the frequency of which is proportional to the actual speed of the corresponding vehicle wheel,
        (ii) converter means, and
        (iii) voltage comparison circuitry means for comparing the output control voltages from two of said converter means and providing a control signal upon the occurrence of a predetermined difference in the output voltages therefrom.

5. Velocity control apparatus for a railway vehicle, as claimed in claim 1, wherein said timing means comprises:
    (a) a timing circuitry including a pick-up relay means,
    (b) condenser means having a controlled discharge timing means, and
    (c) a delayed pick-up relay means.

6. Velocity control apparatus for a railway vehicle, as claimed in claim 4, in which said timing means comprises:
    (a) a timing circuitry including a pick-up relay means,
    (b) condenser means having a controlled discharge timing means, and
    (c) a delayed pick-up relay means.

7. Velocity control apparatus for a railway vehicle, comprising in combination:
    (a) primary means for sensing deceleration of a vehicle wheel at a rate characteristic of wheel slip,
    (b) secondary means for sensing a differential in the speed of two separate wheels on two separate axles during braking of the vehicle, characteristic of a slipping condition of either of the two wheels,
    (c) brake control means,
    (d) means subject to control of said primary means and said secondary means for effecting operation of said brake control means during a braking mode to correct the slip condition so as to prevent wheel slide, and
    (e) timing means for causing said secondary means to become effective to cause operation of said brake control means a certain interval of time after a wheel slip condition occurs without full corrective control action by the said primary means.

8. Velocity control apparatus for a railway vehicle, as claimed in claim 7, wherein said primary means comprises a deceleration sensing circuitry means, including:
    (a) speed responsive tachometer generator means providing a voltage, the frequency of which is proportional to the actual speed of a vehicle wheel,
    (b) converter means operative responsive to supply of said voltage from said tachometer generator means to supply control voltage, and
    (c) differentiator means for sensing a rate of change of said control voltage exceeding a certain degree.

9. Velocity control apparatus for a railway vehicle, as claimed in claim 7, wherein said secondary means comprises a wheel speed comparison circuitry means, including:
    (a) speed responsive tachometer generator means for each of a plurality of vehicle wheels providing a voltage, the frequency of which is proportional to the actual speed of the corresponding vehicle wheel,
    (b) converter means for each of said generator means operative responsive to supply of said voltage from said tachometer generator means to supply control voltage, and
    (c) velocity comparison circuitry means for comparing the output control voltages from two of said converter means and providing a control signal upon the occurrence of a predetermined difference in the output control voltages therefrom.

10. Velocity control apparatus for a railway vehicle, as claimed in claim 7, wherein:

(a) said primary means comprises a deceleration sensing circuitry means, including:
    (i) speed responsive tachometer generator means providing a voltage, the frequency of which is proportional to the actual speed of a vehicle wheel,
    (ii) converter means operative responsive to supply of said voltage from said tachometer generator means to supply a control voltage,
    (iii) differentiator means for sensing a rate of change of said control voltage exceeding a certain degree,
(b) said second secondary means comprises a wheel speed comparison circuitry means, including:
    (i) speed responsive tachometer generator means for each of a plurality of vehicle wheels providing a voltage, the frequency of which is proportional to the actual speed of the corresponding vehicle wheel,
    (ii) converter means for each of said generator means operative responsive to supply of said voltage from said tachometer generator means to supply a control voltage, and
    (iii) velocity comparison circuitry means for comparing the output control voltage from two of said converter means and providing a control signal upon the occurrence of a predetermined difference in the output voltages therefrom.

11. Velocity control apparatus for a railway vehicle, comprising in combination:
(a) primary means for sensing acceleration of a vehicle wheel at a rate characteristic of wheel spin,
(b) secondary means for sensing a differential in the speed of two separate wheels on two separate axles during propulsion of the vehicle characteristics of a wheel spin condition of either of the two wheels,
(c) propulsion control means,
(d) means subject to control of said primary means and said secondary means for effecting operation of said propulsion control means during a propulsion mode to correct a wheel spinning condition, and
(e) timing means for causing said secondary means to become effective to cause operation of said propulsion control means a certain interval of time after a wheel spin condition occurs without full corrective action by said primary means.

12. Velocity control apparatus for a railway vehicle, as claimed in claim 11, wherein said primary means comprises an acceleration sensing circuitry means, including:
(a) speed responsive tachometer generator means providing a voltage, the frequency of which is proportional to the actual speed of a vehicle wheel,
(b) converter means operative responsive to supply of said voltage from said tachometer generator means to supply a control voltage, and
(c) differentiator means for sensing a rate of change of said control voltage exceeding a certain degree.

13. Velocity control apparatus for a railway vehicle, as claimed in claim 11, wherein said secondary means comprises a wheel speed comparison circuitry means, including:
(a) speed responsive tachometer generator means for each of a plurality of vehicle wheels providing a voltage, the frequency of which is proportional to the actual speed of the corresponding vehicle wheel,
(b) converter means for each of said generator means operative responsive to supply of said voltage from said tachometer generator means to supply a control voltage, and
(c) velocity comparison circuitry means for comparing the output control voltages from two of said converter means and providing a control signal upon the occurrence of a predetermined difference in the output voltages therefrom.

14. Velocity control apparatus for a railway vehicle, as claimed in claim 11, wherein:
(a) said primary means comprises a deceleration sensing circuitry means, including:
    (i) speed responsive tachometer generator means providing a voltage, the frequency of which is proportional to the actual speed of a speed of a vehicle wheel,
    (ii) converter means operative responsive to supply of said voltage from said tachometer generator means to supply a control voltage,
    (iii) differentiator means for sensing a rate of change of said control voltage exceeding a certain degree,
(b) said second secondary means comprises a wheel speed comparison circuitry means, including:
    (i) speed responsive tachometer generator means for each of a plurality of vehicle wheels providing a voltage, the frequency of which is proportional to the actual speed of the corresponding vehicle wheel,
    (ii) converter means, and
    (iii) velocity comparison circuitry means for comparing the output control voltages from two of said converter means and providing a control signal upon the occurrence of a predetermined difference in the output voltages therefrom.

References Cited
UNITED STATES PATENTS

| | | | |
|---|---|---|---|
| 3,245,727 | 4/1966 | Anderson et al. | 303—21 |
| 3,300,639 | 1/1967 | Bowman | 246—182 |
| 3,398,995 | 8/1968 | Martin | 303—21 |

DUANE A. REGER, Primary Examiner

U.S. Cl. X.R.

246—188, 187; 303—3, 20

PO-1050
(5/69)

UNITED STATES PATENT OFFICE
CERTIFICATE OF CORRECTION

Patent No. 3,482,887      Dated December 9, 1969

Inventor(s) Charles W. Sheppard

It is certified that error appears in the above-identified patent and that said Letters Patent are hereby corrected as shown below:

Column 8, line 1, "comprising" should be --comprises--

Column 9, line 35, "characteristics" should be --characteristic--

Column 10, line 20, "a deceleration" should be --an acceleration; line 24, "a speed of" should be deleted

SIGNED AND
SEALED
APR 28 1970

(SEAL)
Attest:

Edward M. Fletcher, Jr.
Attesting Officer

WILLIAM E. SCHUYLER, JR.
Commissioner of Patents